United States Patent [19]  
Onodera et al.

[11] Patent Number: 4,992,180  
[45] Date of Patent: Feb. 12, 1991

[54] METHOD OF SEPARATING A HEAVY METAL ION

[75] Inventors: Kazukiyo Onodera, Tokyo; Seiko Funabashi, Asaka, both of Japan; Shinichi Ito, London, United Kingdom

[73] Assignee: Shin-Etsu Chemical Co., Ltd., Tokyo, Japan

[21] Appl. No.: 452,335

[22] Filed: Dec. 19, 1989

[30] Foreign Application Priority Data

Dec. 19, 1988 [JP] Japan ................................. 63-319678

[51] Int. Cl.$^5$ .......................... B01D 15/00; C02F 1/42
[52] U.S. Cl. ..................................... 210/688; 210/912; 210/913; 210/914
[58] Field of Search ............... 210/601, 610, 611, 679, 210/688, 502.1, 912–914

[56] References Cited

U.S. PATENT DOCUMENTS

| | | | |
|---|---|---|---|
| 4,125,708 | 11/1978 | Masri et al. | 210/688 X |
| 4,156,647 | 5/1979 | Nieuwenhuis | 210/913 X |
| 4,285,819 | 8/1981 | Yen et al. | 210/688 X |
| 4,612,247 | 9/1986 | Walsh et al. | 210/688 X |
| 4,859,594 | 8/1989 | Portier | 210/601 X |
| 4,882,066 | 11/1989 | Portier | 210/688 X |

Primary Examiner—Tom Wyse  
Attorney, Agent, or Firm—Oblon, Spivak, McClelland, Maier & Neustadt

[57] ABSTRACT

A method of separating a heavy metal ion from an aqueous solution containing the heavy metal ion, comprising the step of bringing a chitosan derived from a chitosan-producing microorganism into contact with said aqueous solution. The chitosan used, which can be produced by a simple process, has good heavy metal ion adsorptivity; this method can effectively separate heavy metal ion from a solution containing it.

4 Claims, No Drawings

METHOD OF SEPARATING A HEAVY METAL ION

BACKGROUND OF THE INVENTION

1. Field of the Invention

The present invention relates to a method of separating a heavy metal ion by use of a chitosan, and in particular to a method of separating a heavy metal ion by use of a chitosan derived from a chitosan-producing microorganism.

2. Detailed Description of the Prior Art

A method of separating and removing a heavy metal ion from an aqueous solution containing the heavy metal ion by treating the aqueous solution with a chitosan, is known (Japanese Patent Publication (KOKOKU) No. 5834/1976). In the method is used a chitosan obtained by smashing the shell of a crustacean such as shrimps and crabs, treating the smashed shell with alkali to remove proteins, treating the resulting product with acid to remove calcium contents, thereby producing a chitin, and then hydrolyzing the chitin to carry out deacetylation. However, the chitosan used in this method has the problems that the process of preparation thereof is complicated as described above, and, in addition, that it has poor adsorptivity for heavy metal ions, which is presumably caused by its low molecular weight resulting from the harsh alkali treatment and acid treatment.

In order to improve the heavy metal ion adsorptivity of the crustacean-derived chitosan, there have been proposed a method in which the chitosan is reacted with a particular cationizing agent or anionizing agent (Japanese Pre-examination Patent Publication (KOKAI) No. 118,485/1986) and a method in which the chitosan with a low molecular weight is crosslinked with an organic diisocyanate compound (Japanese Pre-examination Patent Publication (KOKAI) No. 133,143/1986).

However, the methods described in the Japanese Pre-examination Patent Publication (KOKAI) Nos. 118,485/1986 and 133,143/1986 have the drawback that they do not eliminate the complication of said method using the shell of crustaceans, but make the preparation process more complicated.

SUMMARY OF THE INVENTION

Accordingly, an object of the present invention is to provide a method of separating a heavy metal ion by use of a chitosan which can be obtained with simple procedure and which is markedly excellent in heavy metal ion adsorptivity.

The present inventors have discovered that the use of a chitosan derived from chitosan-producing microorganisms can make it possible to achieve the object stated above.

Thus, the present invention provides a method of separating a heavy metal ion from an aqueous solution containing the heavy metal ion, comprising the step of bringing a chitosan derived from a chitosan-producing microorganism into contact with said aqueous solution.

The method of the present invention has the advantage of using a microorganism-derived chitosan that can be produced by a simple process as compared with the conventional chitosans derived from crustaceans, and makes it possible to effectively separate a targeted heavy metal ion by virtue of good ion adsorptivity.

DETAILED DESCRIPTION OF THE INVENTION

As the microorganism used in the present invention, any microorganism capable of producing chitosan can be used. For example, the microorganisms include those of *Cunninghamella* such as *Cunninghamella blakesleeana*, *Rhizopus* such as *Rhizopus delemar*, *Absidia* such as *Absidia coerulea*, *Mucor* such as *Mucor rouxii*, *Mortierella* such as *Mortierella isabellina*, *Phycomyces* such as *Phycomyces blakesleanus*, *Choanephora* such as *Choanechora cucurbitarum*, *Aqaricus* such as *Aqaricus bisporus*, and *Neurospora* such as *Neuropora crassa*.

Among these microorganisms, preferred examples include *Cunninghamella blakesleeana* (IFO No. 4443), *Rhizopus delemar* (IFO No. 4775), *Absidia coerulea* (IFO No. 5301), *Mucor rouxii* (IFO No. 5773), and *Mortierella isabellina* (IFO No. 6739). These microorganisms are listed on a catalogue published by Institute for Fermentation Osaka (IFO) and available from the institute under the above deposit Nos. for everybody.

The chitosan can be produced from the above chitosan-producing microorganism by culturing and growing the microorganism according to conventional methods, then drying and grinding the cells, followed by immersing the ground product in an aqueous solution of, for example, acetic acid or the like for extraction treatment. Subsequently, the ground cells are filtered off from the aqueous solution. Thereafter, the filtrate is neutralized with an alkaline aqueous solution so that the chitosan is precipitated, followed by filtration to give a crude chitosan. The crude chitosan can be purified by conventional methods.

The aqueous solution containing a heavy metal ion which may be treated by the method of the present invention includes not only solutions in pure water but also water-based solutions containing another solvent, for example, methanol, ethanol, acetone, tetrahydrofuran, dimethylformamide, or the like. The heavy metal ion includes, for example, ions of heavy metals such as copper, cadmium, mercury, chromium, arsenic, nickel, gold, silver, iron, cobalt, lead, zinc, antimony, tin and the like.

In the method of the present invention, there is no limitation on methods of bringing the chitosan into contact with the aqueous solution containing a heavy metal ion. A typical example is the method in which the chitosan is added to the aqueous solution, and the solution is then stirred.

EXAMPLES

The present invention is now be described in more detail with reference to working examples.

Example of Preparing Chitosan

(1) Cultivation of Microorganism

Cells of each of *Cunninghamella blakesleeana* (IFO No. 4443), *Rhizopus delemar* (IFO No. 4775), *Absidia coerulea* (IFO No. 5301), *Mucor rouxii* (IFO No. 5773) and *Mortierella isabellina* (IFO No. 6739) were inoculated into a liquid medium (MY medium) with a pH of 6.0 containing 3 g of malt extractant, 3 g of yeast extractant, 5 g of peptone and 10 g of glucose, and were cultured with stirring at a rate of 200 rpm at 26.5° C. for 2 to 4 days. The culture mixture was filtered with suction, and the cells were thereby collected. The cells were then washed and frozen to give frozen cells.

(2) Extraction of Chitosan

For each microorganism, the cells collected as above were immersed in ethanol for two hours, so that water was extracted. The cells were then filtered, and the residue on the filter was pelletized and then freeze-dried. Subsequently, the pellets thus obtained were ground with a sample mill, and then boiled with an aqueous 0.5 N NaOH solution for 1 hour to remove proteins. After the resulting mixture was cooled and then filtered, the pellets were washed with water thoroughly so as to become neutral. Thereafter, the pellets were immersed in an aqueous 2% acetic acid solution and allowed to stand in that state at room temperature for 24 hours for extraction of chitosan. The solution was then filtered with suction, and to the resulting filtrate was added a concentrated aqueous sodium hydroxide solution in order to adjust the pH to 9.5, thereby the chitosan was precipitated. The precipitate of the chitosan was filtered off with suction, dissolved in an aqueous 2% acetic acid solution, and the pH of the solution was adjusted to 9.5 to carry out precipitation for purification. The precipitate was filtered out with suction; thereby a purified chitosan was obtained.

Separation of Heavy Metal Ions

Working Examples

The following aqueous solutions containing a heavy metal ion were prepared: (1) 300 ml of an aqueous copper sulfate solution with a pH of 5.2 containing 30 to 40 ppm of copper ion and also containing $KNO_3$ that was added to regulate ionic strength, and (2) 300 ml of an aqueous cadmium sulfate solution with a pH of 5.2 containing 30 to 40 ppm of cadmium ion. To each of these solutions, 200 mg of a chitosan derived from various kinds of microorganisms, obtained as above was added, and the mixture was stirred at a rate of 900 rpm at 25° C. for 120 min. The concentration of copper ion or cadmium ion in the solution was measured before the addition of the chitosan and after treatment with the chitosan; the results obtained are given in Table 1 and 2, respectively.

Comparative Examples

Procedure of removing heavy metal ions was repeated in the same manner as in the above Examples except that a chitosan derived from crustaceans (Deacetylation degree: 99%, product by Cosmo Bio Corp.) was used. The result is also given in Tables 1 and 2.

TABLE 1

| | Separation of copper ion | | |
|---|---|---|---|
| | Cu ion concentration (ppm) | | Adsorption |
| Origin of chitosan | Before treatment | After treatment | rate (%) |
| Cunninghamella blakesleeana | 32.9 | 0.8 | 97.5 |
| Rhizopus delemar | 34.7 | 1.5 | 95.6 |
| Absidia coerulea | 33.3 | 2.7 | 91.8 |
| Mortierella isabeallina | 28.9 | 3.9 | 86.6 |
| Mucor rouxii | 39.8 | 0.7 | 98.2 |
| Crustaceans | 44.1 | 13.1 | 70.3 |

TABLE 2

| | Separation of cadmium ion | | |
|---|---|---|---|
| | Cd ion concentration (ppm) | | Adsorption |
| Origin of chitosan | Before treatment | After treatment | rate (%) |
| Rhizopus delemar | 30.5 | 15.6 | 48.9 |
| Absidia coerulea | 33.0 | 9.1 | 72.4 |
| Mortierella isabeallina | 34.2 | 9.9 | 71.0 |
| Mucor rouxii | 33.9 | 1.8 | 94.8 |
| Crustaceans | 36.7 | 16.3 | 55.7 |

We claim:

1. A method of separating a heavy metal ion from an aqueous solution containing the heavy metal ion, comprising the step of bringing a chitosan derived from a chitosan-producing microorganism into contact with said aqueous solution.

2. The method according to claim 1, wherein said chitosan-producing microorganism is a member selected from the group consisting of Cunninghamella, Rhisopus, Absidia, Mucor, Mortierella, Phycomyces, Choanephora, Aqaricus, and Neurospora.

3. The method according to claim 2, wherein said chitosan-producing microorganism is a member selected from the group consisting of Cunninghamella blakesleeana, Rhizopus delemar, Absidia coerulea, and Mucor rouxii.

4. The method according to claim 1, wherein said heavy metal ion is at least one member selected from the group consisting of ions of copper, cadmium, mercury, chromium, arsenic, nickel, gold, silver, iron, cobalt, lead, zinc, antimony, and tin.

* * * * *